United States Patent
Kunz et al.

(10) Patent No.: US 12,273,707 B2
(45) Date of Patent: Apr. 8, 2025

(54) DERIVING A KEY BASED ON AN EDGE ENABLER CLIENT IDENTIFIER

(71) Applicant: Lenovo (Singapore) Pte. Ltd., New Tech Park (SG)

(72) Inventors: Andreas Kunz, Ladenburg (DE); Sheeba Backia Mary Baskaran, Friedrichsdorf (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 302 days.

(21) Appl. No.: 17/555,196

(22) Filed: Dec. 17, 2021

(65) Prior Publication Data

US 2023/0199483 A1 Jun. 22, 2023

(51) Int. Cl.
 *H04L 9/08* (2006.01)
 *H04L 9/40* (2022.01)
 *H04W 12/041* (2021.01)

(52) U.S. Cl.
 CPC ......... *H04W 12/041* (2021.01); *H04L 9/0819* (2013.01); *H04L 9/0866* (2013.01); *H04L 63/08* (2013.01)

(58) Field of Classification Search
 CPC ... H04W 12/041; H04W 12/02; H04W 12/69; H04L 9/0819; H04L 9/0866; H04L 63/08
 See application file for complete search history.

(56) References Cited

U.S. PATENT DOCUMENTS

| 9,088,557 | B2 * | 7/2015 | Aoyagi | H04L 9/0869 |
| 2014/0351595 | A1 * | 11/2014 | Blom | H04L 9/3213 |
| | | | | 713/169 |
| 2023/0068196 | A1 * | 3/2023 | Sasi | H04W 12/06 |

FOREIGN PATENT DOCUMENTS

WO  WO-2021167399 A1 *  8/2021  ........... H04L 9/0836

OTHER PUBLICATIONS

"3rd Generation Partnership Project; Technical Specification Group Services and System Aspects; Study on security aspects of enhancement of support for edge computing in the 5G Core (5GC) (Release 17)", Dec. 3, 2021 (Dec. 3, 2021), pp. 1-78, XP052083012 (Year: 2021).*

(Continued)

*Primary Examiner* — Khoi V Le
(74) *Attorney, Agent, or Firm* — Kunzler Bean & Adamson

(57) ABSTRACT

Apparatuses, methods, and systems are disclosed for deriving a key based on an edge enabler client identifier. One method includes receiving, at a network function, a request message from an edge server function. The request message includes: an edge server identifier; and an edge enabler client identifier (EEC-ID), wherein the EEC-ID includes: an unencrypted EEC-ID; or an encrypted EEC-ID. The encrypted EEC-ID is encrypted with an authentication and key management (AKMA) key ($K_{AKMA}$). The method includes deriving a unique key ($K_{AFEEC}$) based on the edge server identifier and the EEC-ID. The method includes transmitting a response message to the edge server function. The response message includes: the $K_{AFEEC}$; and an unencrypted EEC-ID.

19 Claims, 6 Drawing Sheets

(56) References Cited

OTHER PUBLICATIONS

3GPP, "3rd Generation Partnership Project; Technical Specification Group Services and System Aspects; Security aspects of enhancement of support for enabling edge applications; Stage 2 (Release 17)", 3GPP TS 33.558 V0.3.0, Nov. 2021, pp. 1-11.

3GPP, "3rd Generation Partnership Project; Technical Specification Group Services and System Aspects; Authentication and Key Management for Applications (AKMA) based on 3GPP credentials in the 5G System (5GS) (Release 17)", 3GPP TS 33.535 V17.0.0, Dec. 2020, pp. 1-20.

3GPP, "3rd Generation Partnership Project; Technical Specification Group Services and System Aspects; Generic Authentication Architecture (GAA); Access to network application functions using Hypertext Transfer Protocol over Transport Layer Security (HTTPS) (Release 16)", 3GPP TS 33.222 V16.1.0, Dec. 2020, pp. 1-40.

3GPP, "3rd Generation Partnership Project; Technical Specification Group Services and System Aspects; Generic Authentication Architecture (GAA); Generic Bootstrapping Architecture (GBA) (Release 17)", 3GPP TS 33.220 V17.2.0, Dec. 2021, pp. 1-103.

3GPP, "3rd Generation Partnership Project; Technical Specification Group Services and System Aspects; Architecture for enabling Edge Applications; (Release 17)", 3GPP TS 23.558 V17.2.0, Dec. 2021, pp. 1-163.

3GPP, "3rd Generation Partnership Project; Technical Specification Group Services and System Aspects; Study on security aspects of enhancement of support for edge computing in the 5G Core (5GC) (Release 17)", 3GPP TR 33.839 V17.0.0, Dec. 2021, pp. 1-78.

PCT/IB2022/062260, "Notification of Transmittal of the International Search Report and the Written Opinion of the International Searching Authority, or the Declaration", International Searching Authority, Feb. 27, 2023, pp. 1-14.

* cited by examiner

DERIVING A KEY BASED ON AN EDGE ENABLER CLIENT IDENTIFIER

FIELD

The subject matter disclosed herein relates generally to wireless communications and more particularly relates to deriving a key based on an edge enabler client identifier.

BACKGROUND

In certain wireless communications networks, a derived key may be used for multiple edge configuration servers and/or edge enabler servers. The reuse of the derived key may result in security issues.

BRIEF SUMMARY

Methods for deriving a key based on an edge enabler client identifier are disclosed. Apparatuses and systems also perform the functions of the methods. One embodiment of a method includes receiving, at a network function, a request message from an edge server function. The request message includes: an edge server identifier; and an edge enabler client identifier (EEC-ID), wherein the EEC-ID includes: an unencrypted EEC-ID; or an encrypted EEC-ID. The encrypted EEC-ID is encrypted with an authentication and key management (AKMA) key ($K_{AKMA}$). In some embodiments, the method includes deriving a unique key ($K_{AFEEC}$) based on the edge server identifier and the EEC-ID. In certain embodiments, the method includes transmitting a response message to the edge server function. The response message includes: the $K_{AFEEC}$; and an unencrypted EEC-ID.

One apparatus for deriving a key based on an edge enabler client identifier includes a network function. In some embodiments, the apparatus includes a receiver that receives a request message from an edge server function. The request message includes: an edge server identifier; and an edge enabler client identifier (EEC-ID). The EEC-ID includes: an unencrypted EEC-ID; or an encrypted EEC-ID, wherein the encrypted EEC-ID is encrypted with an authentication and key management (AKMA) key ($K_{AKMA}$). In various embodiments, the apparatus includes a processor that derives a unique key ($K_{AFEEC}$) based on the edge server identifier and the EEC-ID. In certain embodiments, the apparatus includes a transmitter that transmits a response message to the edge server function. The response message includes: the $K_{AFEEC}$; and an unencrypted EEC-ID.

Another embodiment of a method for deriving a key based on an edge enabler client identifier includes deriving, at a user equipment, a first unique key ($K_{AFEEC}$) based an edge enabler client identifier (EEC-ID). In some embodiments, the method includes transmitting a request message to an edge server function. The request message includes: an unencrypted EEC-ID; or an encrypted EEC-ID. The encrypted EEC-ID is encrypted with an authentication and key management (AKMA) key ($K_{AKMA}$). In certain embodiments, the method includes receiving a response message from the edge server function. The response message includes a second $K_{AFEEC}$ used by the edge server function.

Another apparatus for deriving a key based on an edge enabler client identifier includes a user equipment. In some embodiments, the apparatus includes a processor that derives a first unique key ($K_{AFEEC}$) based an edge enabler client identifier (EEC-ID). In various embodiments, the apparatus includes a transmitter that transmits a request message to an edge server function. The request message includes: an unencrypted EEC-ID; or an encrypted EEC-ID. The encrypted EEC-ID is encrypted with an authentication and key management (AKMA) key ($K_{AKMA}$). In certain embodiments, the apparatus includes a receiver that receives a response message from the edge server function. The response message includes a second $K_{AFEEC}$ used by the edge server function.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
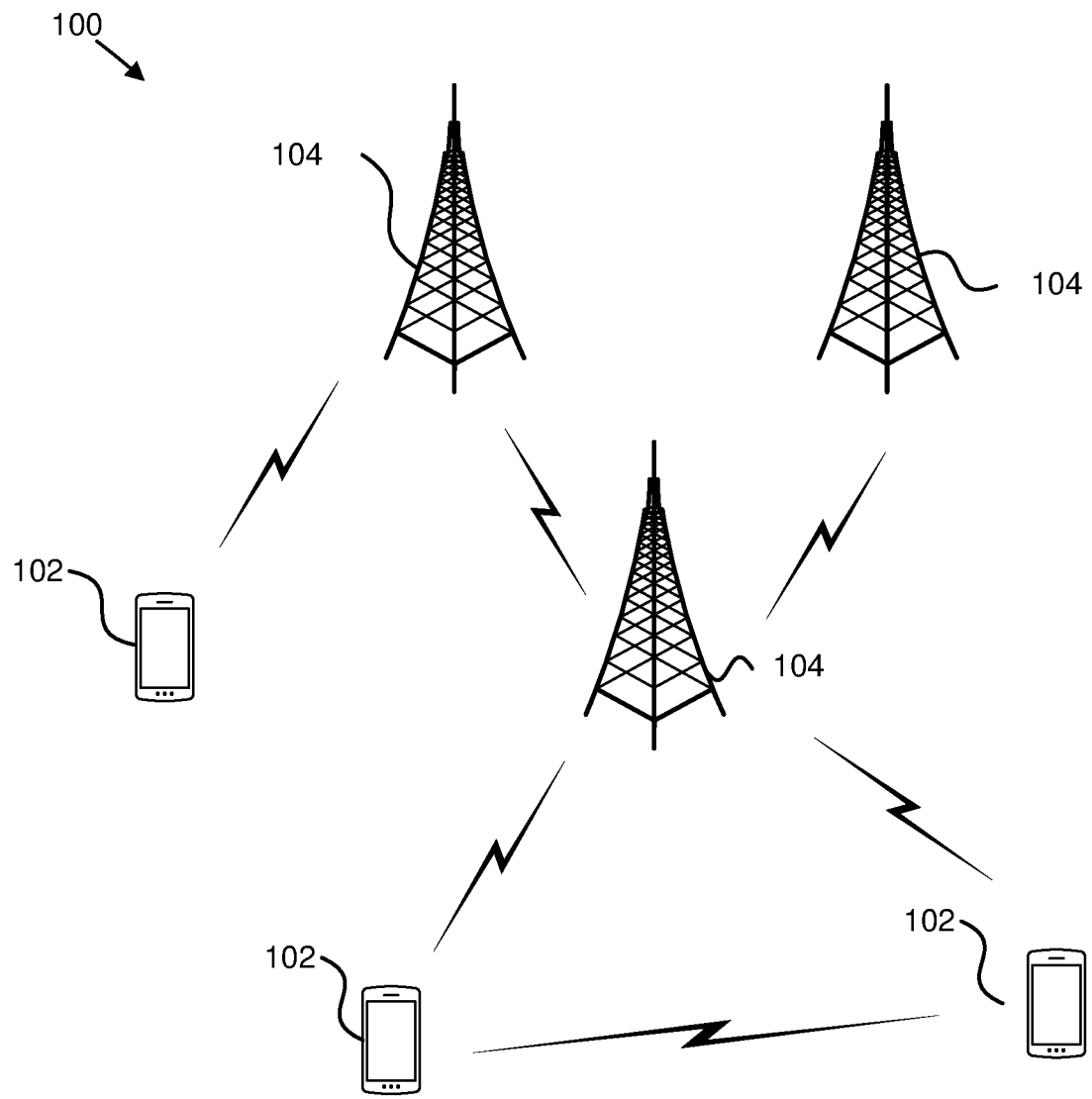
FIG. 1 is a schematic block diagram illustrating one embodiment of a wireless communication system for deriving a key based on an edge enabler client identifier.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for deriving a key based on an edge enabler client identifier. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may derive, at a user equipment, a first unique key ($K_{AFEEC}$) based an edge enabler client identifier (EEC-ID). In some embodiments, the remote unit 102 may transmit a request message to an edge server function. The request message includes: an unencrypted EEC-ID; or an encrypted EEC-ID. The encrypted EEC-ID is encrypted with an authentication and key management (AKMA) key ($K_{AKMA}$). In certain embodiments, the remote unit 102 may receive a response message from the edge server function. The response message includes a second $K_{AFEEC}$ used by the edge server function. Accordingly, the remote unit 102 may be used for deriving a key based on an edge enabler client identifier.

In certain embodiments, a network unit 104 may receive, at a network function, a request message from an edge server function. The request message includes: an edge server identifier; and an edge enabler client identifier (EEC-ID), wherein the EEC-ID includes: an unencrypted EEC-ID; or an encrypted EEC-ID. The encrypted EEC-ID is encrypted with an authentication and key management (AKMA) key ($K_{AKMA}$). In some embodiments, the network unit 104 may derive a unique key ($K_{AFEEC}$) based on the edge server identifier and the EEC-ID. In certain embodiments, the network unit 104 may transmit a response message to the edge server function. The response message includes: the $K_{AFEEC}$; and an unencrypted EEC-ID. Accordingly, the network unit 104 may be used for deriving a key based on an edge enabler client identifier.

Figure 2:
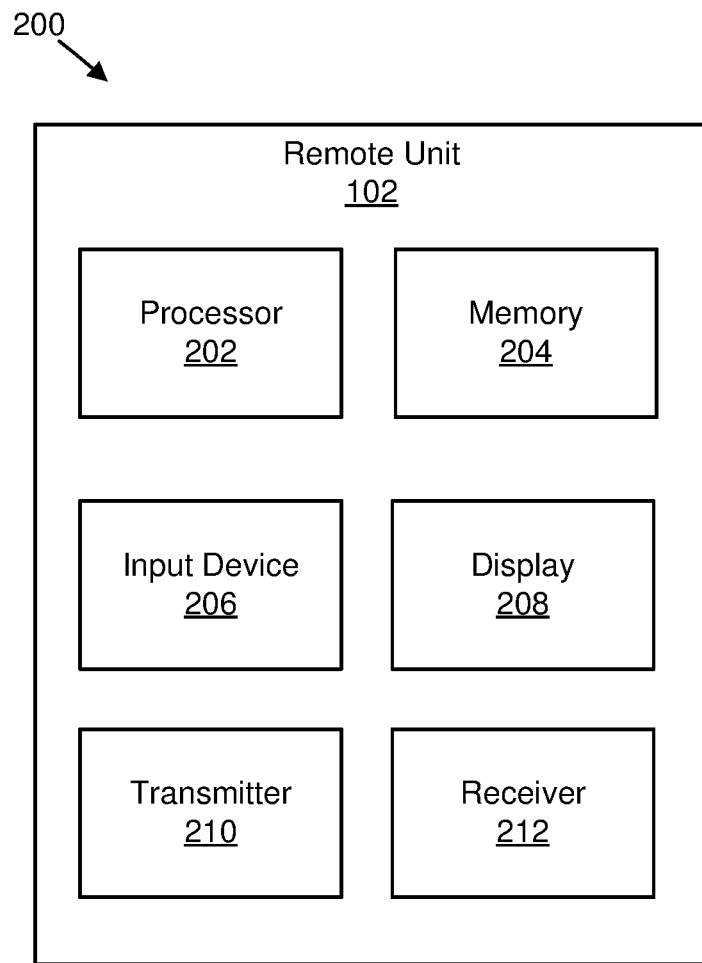
FIG. 2 is a schematic block diagram illustrating one embodiment of an apparatus that may be used for deriving a key based on an edge enabler client identifier.

FIG. 2 depicts one embodiment of an apparatus 200 that may be used for deriving a key based on an edge enabler client identifier. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the processor 202 derives a first unique key ($K_{AFEEC}$) based an edge enabler client identifier (EEC-ID). In various embodiments, the transmitter 210 transmits a request message to an edge server function. The request message includes: an unencrypted EEC-ID; or an encrypted EEC-ID. The encrypted EEC-ID is encrypted with an authentication and key management (AKMA) key ($K_{AKMA}$). In certain embodiments, the receiver 212 receives a response message from the edge server function. The response message includes a second $K_{AFEEC}$ used by the edge server function.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
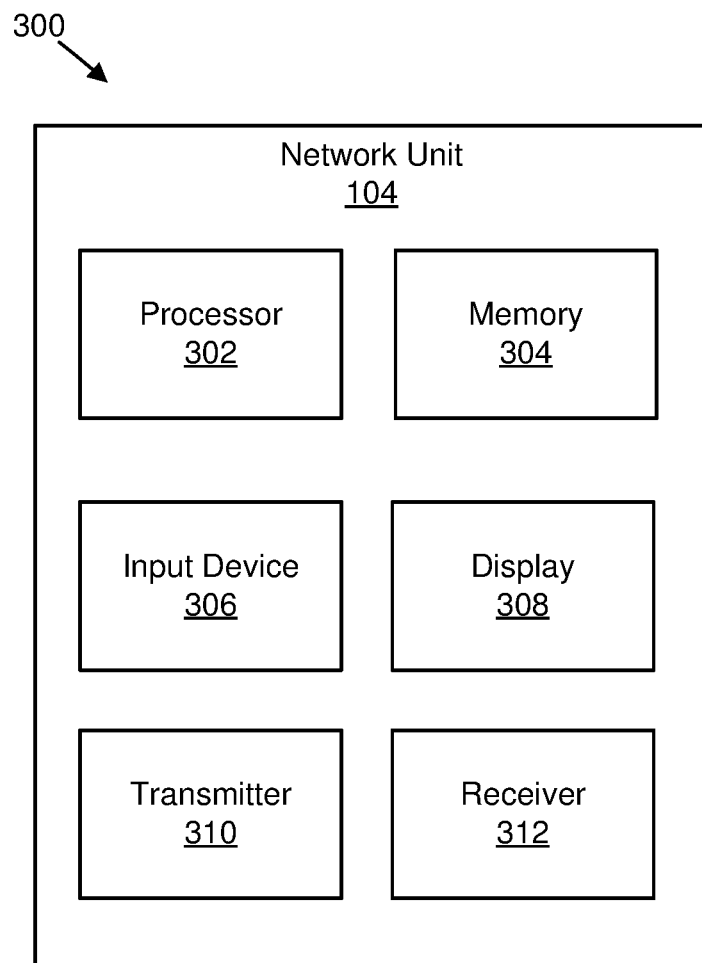
FIG. 3 is a schematic block diagram illustrating one embodiment of an apparatus that may be used for deriving a key based on an edge enabler client identifier.

FIG. 3 depicts one embodiment of an apparatus 300 that may be used for deriving a key based on an edge enabler client identifier. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the receiver 312 receives a request message from an edge server function. The request message includes: an edge server identifier; and an edge enabler client identifier (EEC-ID). The EEC-ID includes: an unencrypted EEC-ID; or an encrypted EEC-ID, wherein the encrypted EEC-ID is encrypted with an authentication and key management (AKMA) key ($K_{AKMA}$). In various embodiments, the processor 302 derives a unique key ($K_{AFEEC}$) based on the edge server identifier and the EEC-ID. In certain embodiments, the transmitter 310 transmits a response message to the edge server function. The response message includes: the $K_{AFEEC}$; and an unencrypted EEC-ID.

In certain embodiments, authentication and key management for applications ("AKMA") based on 3GPP credentials in a fifth generation ("5G") system ("5GS") may generate only a single key per application or application function ("AF").

In some embodiments, a user equipment ("UE") hosting an edge enabler client ("EEC") may have multiple EECs connected to different edge configuration servers ("ECSs"). In various embodiments, there may be no restriction that multiple EECs may be connected to the same ECS. In certain embodiments, a UE hosting an EEC may have multiple EECs connected to different edge enabler servers ("EESs"). In some embodiments, there may be no restriction that multiple EECs may be connected to the same EES.

In various embodiments, the following may apply for enhanced data global system for mobile communication ("GSM") evolution ("EDGE") 1 ("EDGE-1"): 1) one EEC may communicate with one or more EESs for one or more application clients ("AC") concurrently; and 2) one EES may communicate with one or more EECs concurrently.

In certain embodiments, the following may apply for EDGE 4 ("EDGE-4"): 1) one EEC may communicate with one or more ECSs concurrently; and 2) one ECS may communicate with one or more EECs concurrently.

In some embodiments, if AKMA is used for the authentication then a single AKMA application key ("$K_{AF}$") may be created and may be reused by all ECSs and EES. In such embodiments, the reuse of the same key in different endpoints may result in security issues.

In various embodiments, a legal interception ("LI") requirement may be fulfilled and a unique key per EEC-ECS and/or EEC-EES pair may be provided.

Figure 4:
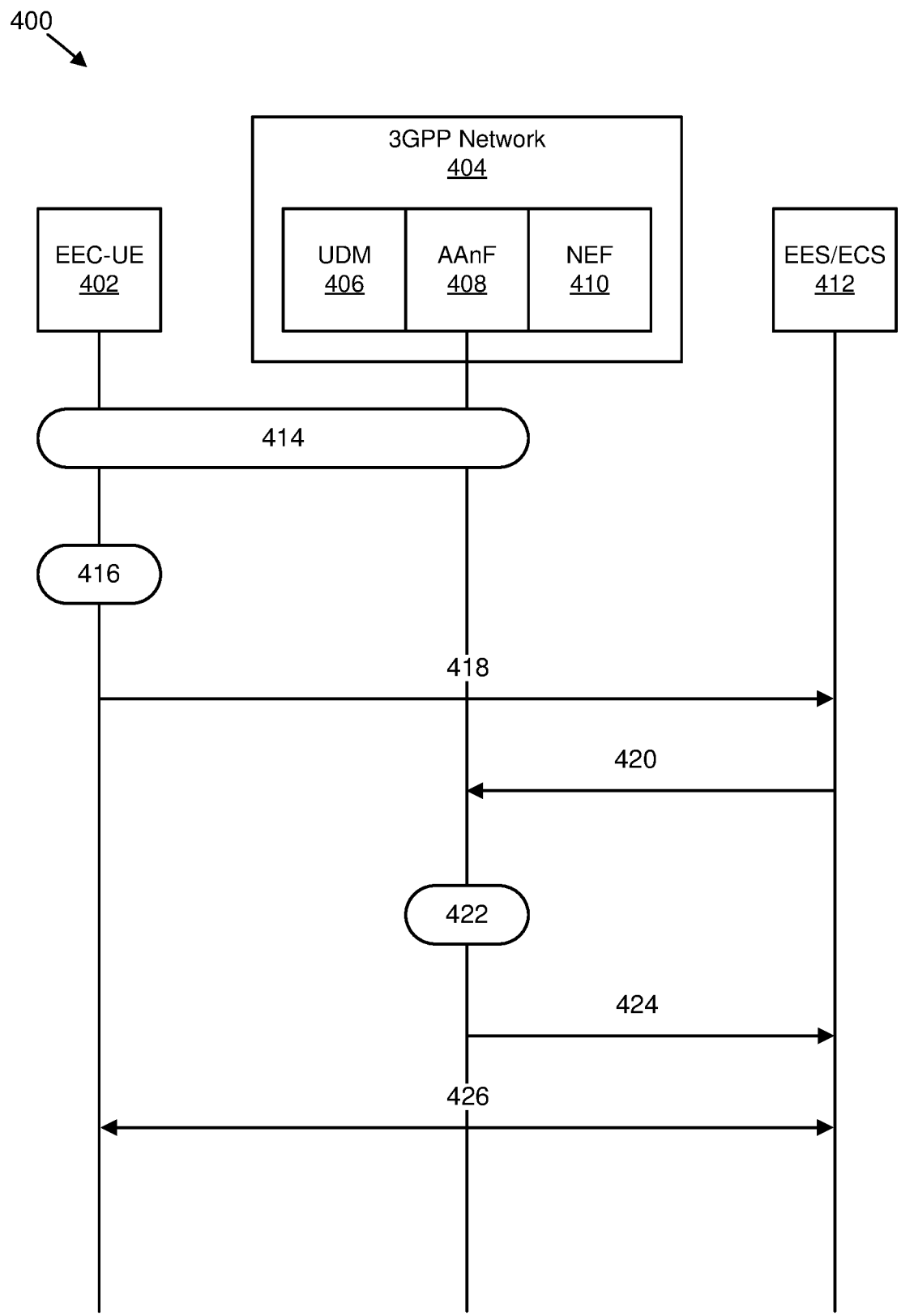
FIG. 4 is a schematic block diagram illustrating one embodiment of a system for authentication and interface protection between an EEC and an EES and/or an ECS.

FIG. 4 is a schematic block diagram illustrating one embodiment of a system 400 for authentication and interface protection between an EEC and an EES and/or an ECS. The system 400 includes a UE EEC ("EEC-UE") 402, a 3GPP network 404 (including a UDM 406, an AKMA anchor function ("AAnF") 408, and a network exposure function ("NEF") 410), and an EES and/or an ECS ("EES/ECS") 412. It should be noted that each of the communications described may include one or more messages.

In a first communication 414, the EEC-UE 402 and the 3GPP network 404 run primary authentication and derive an AKMA anchor key ("$K_{AKMA}$"). The EEC-UE 402 learns an AKMA key identifier ("ID") ("A-KID") and the $K_{AKMA}$ (e.g., the UE generates the $K_{AKMA}$ and the A-KID from the $K_{AUSF}$ before initiating communication with an AKMA application function).

The EEC-UE 402 derives 416 a security key ("$K_{AFEEC}$") based on two options, but in the same way as the AAnF: 1) include an EEC ID (or an application ID) in a $K_{AF}$ key derivation (e.g., $K_{AFEEC}$=KDF ($K_{AKMA}$, EES-ID/ECS-ID, EEC-ID)); or 2) add an extra layer in the key hierarchy (e.g., first derive the $K_{AF}$ normally with $K_{AF}$=KDF ($K_{AKMA}$, EES-ID/ECS-ID) and derive a new key in the AAnF based on $K_{AF}$ and the EEC ID (e.g., $K_{AFEEC}$=KDF($K_{AF}$, EEC-ID)). If there is no application ID like the EEC-ID available for a service, then the EEC-UE 402 derives the $K_{AF}$ (e.g., as defined in an AKMA procedure only with an AF-ID (e.g., ECS-ID and/or EES-ID)).

In a second communication 418, the EEC-UE 402 sends a session establishment request to the EES/ECS 412. The session establishment request includes the parameters A-KID and an EEC-ID (e.g., either unencrypted or encrypted with the $K_{AKMA}$-E($K_{AKMA}$, EEC-ID)).

In a third communication 420, the EES/ECS 412 requests $K_{AFEEC}$ from the 3GPP network 404. In this request, the EES/ECS 412 sends A-KID and AF-ID and either the encrypted EEC-ID e.g., (E($K_{AKMA}$, EEC-ID)) or the EEC-ID in cleartext (e.g., encrypted) depending on what is sent by the UE.

The 3GPP network 404 executes 422 authentication and authorization for the EES/ECS 412 (e.g., as defined in an AKMA procedure) and, if the result is successful, then the 3GPP decrypts the EEC-ID (e.g., if encrypted) with $K_{AKMA}$ and derives a security key $K_{AFEEC}$ in the AAnF 408 based on two options, but in the same way as in the UE: 1) include EEC ID in the $K_{AF}$ key derivation (e.g., $K_{AFEEC}$=KDF ($K_{AKMA}$, EES-ID/ECS-ID, EEC-ID)); or 2) add an extra layer in the key hierarchy (e.g., first derive the $K_{AF}$ normally with $K_{AF}$=KDF ($K_{AKMA}$, EES-ID/ECS-ID) and derive a new key in the AAnF based on $K_{AF}$ and the EEC ID (e.g., $K_{AFEEC}$=KDF($K_{AF}$, EEC-ID)). If there is no application ID like the EEC-ID available for a service, then the EEC-UE 402 derives the $K_{AF}$ (e.g., as defined in the AKMA procedure only with the AF-ID (e.g., ECS-ID and/or EES-ID)). If LI needs to be performed in the serving network, a relevant network function for LI may query the AAnF 408 in a home public land mobile network ("HPLMN") for the corresponding keys related to the active services bound to a specific subscription permanent identifier ("SUPI").

In a fourth communication 424, the 3GPP network 404 sends $K_{AFEEC}$ and an expiration time for the key to the EES/ECS 412. If the EEC-ID is encrypted, the AAnF 408 sends an unencrypted EEC-ID to the EES/ECS 412.

In a fifth communication 426, the EEC-UE 402 and the EES/ECS 412 use $K_{AFEEC}$ in Ua*protocol, instead of $K_{AF}$. The Ua*protocol is a protocol running between a UE and an AF (e.g., for carrying A-KID).

Figure 5:
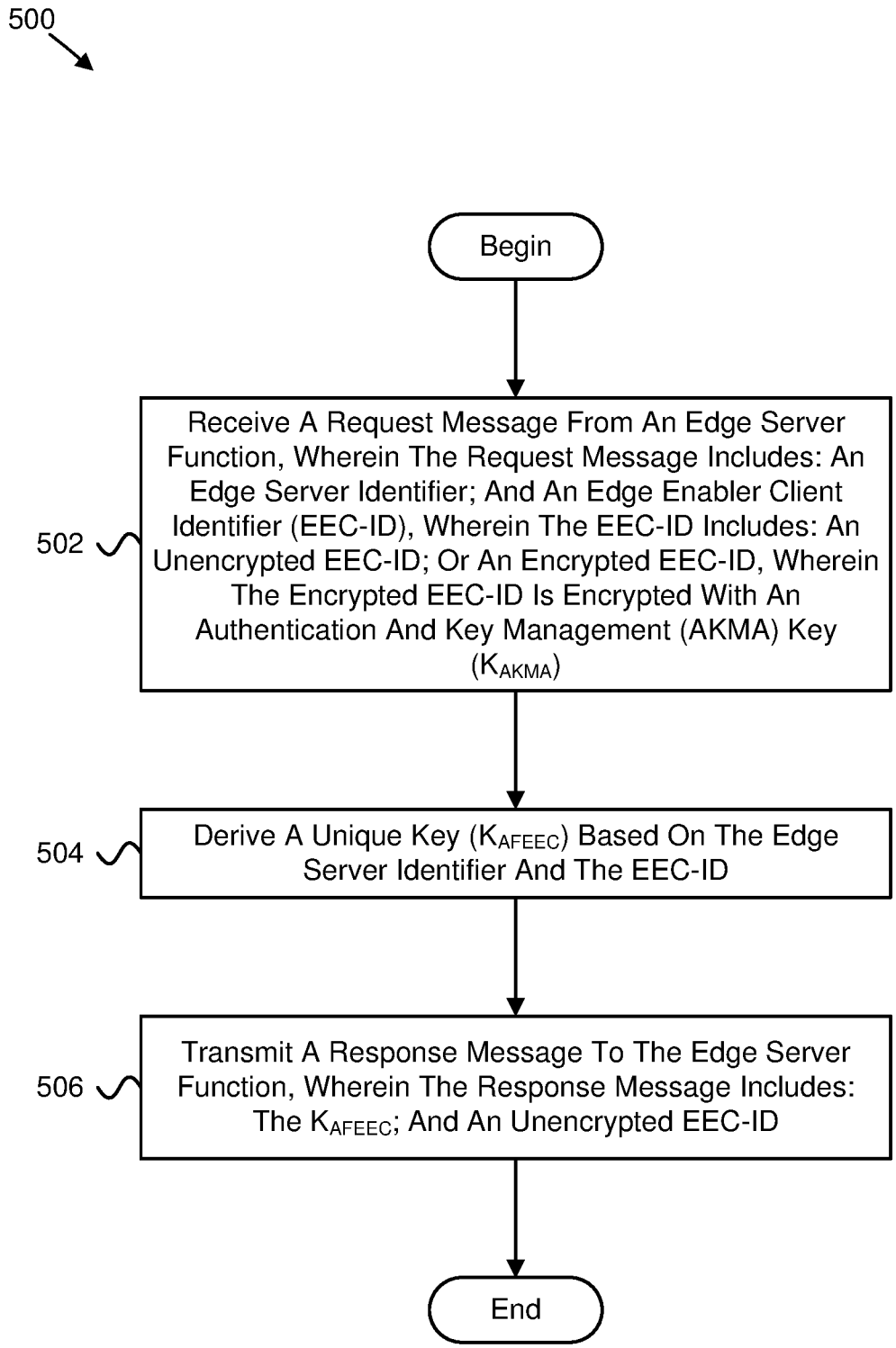
FIG. 5 is a flow chart diagram illustrating one embodiment of a method for deriving a key based on an edge enabler client identifier.

FIG. 5 is a flow chart diagram illustrating one embodiment of a method 500 for deriving a key based on an edge enabler client identifier. In some embodiments, the method 500 is performed by an apparatus, such as the network unit 104. In certain embodiments, the method 500 may be performed by a processor executing program code, for example, a microcontroller, a microprocessor, a CPU, a GPU, an auxiliary processing unit, a FPGA, or the like.

In various embodiments, the method 500 includes receiving 502, at a network function, a request message from an edge server function. The request message includes: an edge server identifier; and an edge enabler client identifier (EEC-ID), wherein the EEC-ID includes: an unencrypted EEC-ID; or an encrypted EEC-ID. The encrypted EEC-ID is encrypted with an authentication and key management (AKMA) key ($K_{AKMA}$). In some embodiments, the method 500 includes deriving 504 a unique key ($K_{AFEEC}$) based on the edge server identifier and the EEC-ID. In certain embodiments, the method 500 includes transmitting 506 a response message to the edge server function. The response message includes: the $K_{AFEEC}$; and an unencrypted EEC-ID.

In certain embodiments, the network function includes an AKMA anchor function. In some embodiments, the edge server function includes an edge configuration server, an edge enabler server, or a combination thereof. In various embodiments, the edge server identifier includes an edge configuration identifier, an edge enabler server identifier, or a combination thereof.

In one embodiment, the request message further includes an AKMA key identifier. In certain embodiments, the method 500 further includes, in response to the EEC-ID including the encrypted EEC-ID, decrypting the EEC-ID with the $K_{AKMA}$. In some embodiments, decrypting the EEC-ID with the $K_{AKMA}$ includes decrypting the EEC-ID in response to the EEC-ID being encrypted. In various embodiments, the response message further includes a $K_{AFEEC}$ expiry time.

Figure 6:
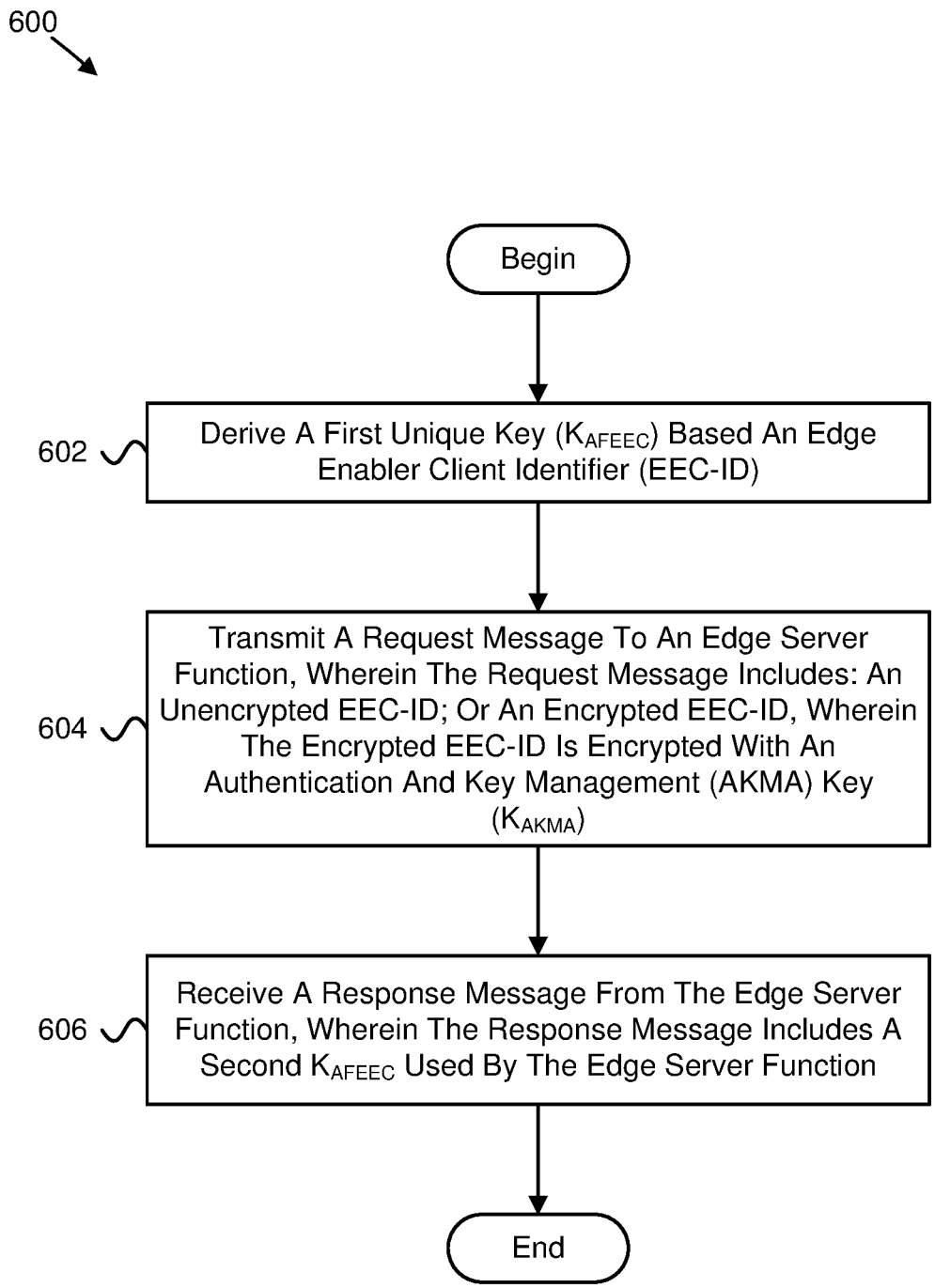
FIG. 6 is a flow chart diagram illustrating another embodiment of a method for deriving a key based on an edge enabler client identifier.

FIG. 6 is a flow chart diagram illustrating another embodiment of a method 600 for deriving a key based on an edge enabler client identifier. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

In various embodiments, the method 600 includes deriving 602, at a user equipment, a first unique key ($K_{AFEEC}$) based an edge enabler client identifier (EEC-ID). In some embodiments, the method 600 includes transmitting 604 a request message to an edge server function. The request message includes: an unencrypted EEC-ID; or an encrypted EEC-ID. The encrypted EEC-ID is encrypted with an authentication and key management (AKMA) key ($K_{AKMA}$). In certain embodiments, the method 600 includes receiving 604 a response message from the edge server function. The response message includes a second $K_{AFEEC}$ used by the edge server function.

In certain embodiments, the edge server function includes an edge configuration server, an edge enabler server, or a combination thereof. In some embodiments, the request message further includes an AKMA key identifier.

In various embodiments, the method 600 further includes performing an authentication prior to deriving the first $K_{AFEEC}$. In one embodiment, the method 600 further includes computing the $K_{AKMA}$. In certain embodiments, the method 600 further includes computing an AKMA key identifier.

In one embodiment, a method of a network function includes: receiving a request message from an edge server function, wherein the request message includes: an edge server identifier; and an edge enabler client identifier (EEC-ID), wherein the EEC-ID includes: an unencrypted EEC-ID; or an encrypted EEC-ID, wherein the encrypted EEC-ID is encrypted with an authentication and key management (AKMA) key ($K_{AKMA}$); deriving a unique key ($K_{AFEEC}$) based on the edge server identifier and the EEC-ID; and transmitting a response message to the edge server function, wherein the response message includes: the $K_{AFEEC}$; and an unencrypted EEC-ID.

In certain embodiments, the network function includes an AKMA anchor function.

In some embodiments, the edge server function includes an edge configuration server, an edge enabler server, or a combination thereof.

In various embodiments, the edge server identifier includes an edge configuration identifier, an edge enabler server identifier, or a combination thereof.

In one embodiment, the request message further includes an AKMA key identifier.

In certain embodiments, the method further includes, in response to the EEC-ID including the encrypted EEC-ID, decrypting the EEC-ID with the $K_{AKMA}$.

In some embodiments, decrypting the EEC-ID with the $K_{AKMA}$ includes decrypting the EEC-ID in response to the EEC-ID being encrypted.

In various embodiments, the response message further includes a $K_{AFEEC}$ expiry time.

In one embodiment, an apparatus includes a network function. The apparatus further includes: a receiver that receives a request message from an edge server function, wherein the request message includes: an edge server identifier; and an edge enabler client identifier (EEC-ID), wherein the EEC-ID includes: an unencrypted EEC-ID; or an encrypted EEC-ID, wherein the encrypted EEC-ID is encrypted with an authentication and key management (AKMA) key ($K_{AKMA}$); a processor that derives a unique key ($K_{AFEEC}$) based on the edge server identifier and the EEC-ID; and a transmitter that transmits a response message to the edge server function, wherein the response message includes: the $K_{AFEEC}$; and an unencrypted EEC-ID.

In certain embodiments, the network function includes an AKMA anchor function.

In some embodiments, the edge server function includes an edge configuration server, an edge enabler server, or a combination thereof.

In various embodiments, the edge server identifier includes an edge configuration identifier, an edge enabler server identifier, or a combination thereof.

In one embodiment, the request message further includes an AKMA key identifier.

In certain embodiments, the processor, in response to the EEC-ID including the encrypted EEC-ID, decrypts the EEC-ID with the $K_{AKMA}$.

In some embodiments, the processor decrypting the EEC-ID with the $K_{AKMA}$ includes the processor decrypting the EEC-ID in response to the EEC-ID being encrypted.

In various embodiments, the response message further includes a $K_{AFEEC}$ expiry time.

In one embodiment, a method of a user equipment includes: deriving a first unique key ($K_{AFEEC}$) based an edge enabler client identifier (EEC-ID); transmitting a request message to an edge server function, wherein the request message includes: an unencrypted EEC-ID; or an encrypted EEC-ID, wherein the encrypted EEC-ID is encrypted with an authentication and key management (AKMA) key ($K_{AKMA}$); and receiving a response message from the edge server function, wherein the response message includes a second $K_{AFEEC}$ used by the edge server function.

In certain embodiments, the edge server function includes an edge configuration server, an edge enabler server, or a combination thereof.

In some embodiments, the request message further includes an AKMA key identifier.

In various embodiments, the method further includes performing an authentication prior to deriving the first $K_{AFEEC}$.

In one embodiment, the method further includes computing the $K_{AKMA}$.

In certain embodiments, the method further includes computing an AKMA key identifier.

In one embodiment, an apparatus includes a user equipment. The apparatus further includes: a processor that derives a first unique key ($K_{AFEEC}$) based an edge enabler client identifier (EEC-ID); a transmitter that transmits a request message to an edge server function, wherein the request message includes: an unencrypted EEC-ID; or an encrypted EEC-ID, wherein the encrypted EEC-ID is encrypted with an authentication and key management (AKMA) key ($K_{AKMA}$); and a receiver that receives a response message from the edge server function, wherein the response message includes a second $K_{AFEEC}$ used by the edge server function.

In certain embodiments, the edge server function includes an edge configuration server, an edge enabler server, or a combination thereof.

In some embodiments, the request message further includes an AKMA key identifier.

In various embodiments, the processor performs an authentication prior to deriving the first $K_{AFEEC}$.

In one embodiment, the processor computes the $K_{AKMA}$.

In certain embodiments, the processor computes an AKMA key identifier.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a network function, the method comprising:
    receiving a request message from an edge server function, wherein the request message comprises: an edge server identifier and an edge enabler client identifier (EEC-ID), wherein the EEC-ID comprises an unencrypted EEC-ID or an encrypted EEC-ID, wherein the encrypted EEC-ID is encrypted with an authentication and key management (AKMA) key ($K_{AKMA}$);
    deriving an application specific key ($K_{AF}$) based on the edge server identifier;
    authenticating the edge server function;
    when the edge server function is authenticated, decrypting the EEC-ID and deriving a unique key ($K_{AFEEC}$) in an AKMA anchor function (AAnF) based on the $K_{AF}$ and the EEC-ID; and
    transmitting a response message to the edge server function, wherein the response message comprises the $K_{AFEEC}$ and an unencrypted EEC-ID.

2. The method of claim 1, wherein the network function comprises an AKMA anchor function.

3. The method of claim 1, wherein the edge server function comprises an edge configuration server, an edge enabler server, or a combination thereof.

4. The method of claim 1, wherein the edge server identifier comprises an edge configuration identifier, an edge enabler server identifier, or a combination thereof.

5. The method of claim 1, wherein the request message further comprises an AKMA key identifier.

6. The method of claim 1, further comprising, in response to the EEC-ID comprising the encrypted EEC-ID, decrypting the EEC-ID with the $K_{AKMA}$.

7. The method of claim 6, wherein decrypting the EEC-ID with the $K_{AKMA}$ comprises decrypting the EEC-ID in response to the EEC-ID being encrypted.

8. The method of claim 1, wherein the response message further comprises a $K_{AFEEC}$ expiry time.

9. An apparatus for performing a network function, the apparatus comprising:
    at least one memory; and
    at least one processor coupled with the at least one memory and configured to cause the apparatus to:
    receive a request message from an edge server function, wherein the request message comprises an edge server identifier and an edge enabler client identifier (EEC-ID), wherein the EEC-ID comprises an unencrypted EEC-ID or an encrypted EEC-ID, wherein the encrypted EEC-ID is encrypted with an authentication and key management (AKMA) key ($K_{AKMA}$);
    derive an application specific key ($K_{AF}$) based on the edge server identifier;
    authenticate the edge server function;
    when the edge server function is authenticated, decrypt the EEC-ID and derive a unique key ($K_{AFEEC}$) in an AKMA anchor function (AAnF) based on the $K_{AF}$ and the EEC-ID; and
    transmit a response message to the edge server function, wherein the response message comprises the $K_{AFEEC}$ and an unencrypted EEC-ID.

10. The apparatus of claim 9, wherein the network function comprises an AKMA anchor function.

11. The apparatus of claim 9, wherein the edge server function comprises an edge configuration server, an edge enabler server, or a combination thereof.

12. The apparatus of claim 9, wherein the edge server identifier comprises an edge configuration identifier, an edge enabler server identifier, or a combination thereof.

13. The apparatus of claim 9, wherein the request message further comprises an AKMA key identifier.

14. The apparatus of claim 9, wherein the at least one processor is configured to cause the apparatus to, in response to the EEC-ID comprising the encrypted EEC-ID, decrypt the EEC-ID with the $K_{AKMA}$.

15. A user equipment (UE), comprising:
    at least one memory; and
    at least one processor coupled with the at least one memory and configured to cause the UE to:
    transmit a request message to an edge server function, wherein the request message comprises an unencrypted EEC-ID or an encrypted EEC-ID, wherein the encrypted EEC-ID is encrypted with an authentication and key management (AKMA) key ($K_{AKMA}$);
    authenticate the edge server function;
    when the edge server function is authenticated, decrypt the EEC-ID and derive a first unique key ($K_{AFEEC}$) based on an application specific key ($K_{AF}$) and an edge enabler client identifier (EEC-ID); and
    receive a response message from the edge server function, wherein the response message comprises a second $K_{AFEEC}$ associated with the edge server function.

16. The UE of claim 15, wherein the edge server function comprises an edge configuration server, an edge enabler server, or a combination thereof.

17. The UE of claim 15, wherein the at least one processor is configured to cause the UE to compute the $K_{AKMA}$.

18. The UE of claim 15, wherein the at least one processor is configured to cause the UE to compute an AKMA key identifier.

19. A hardware processor for wireless communication, comprising:
    at least one controller coupled with at least one memory and configured to cause the hardware processor to:
    transmit a request message to an edge server function, wherein the request message comprises an unencrypted EEC-ID or an encrypted EEC-ID, wherein the encrypted EEC-ID is encrypted with an authentication and key management (AKMA) key ($K_{AKMA}$);
    authenticate the edge server function;
    when the edge server function is authenticated, decrypt the EEC-ID and derive a first unique key ($K_{AFEEC}$) based on an application specific key ($K_{AF}$) and an edge enabler client identifier (EEC-ID); and
    receive a response message from the edge server function, wherein the response message comprises a second $K_{AFEEC}$ used by the edge server function.

* * * * *